United States Patent Office 3,441,373
Patented Apr. 29, 1969

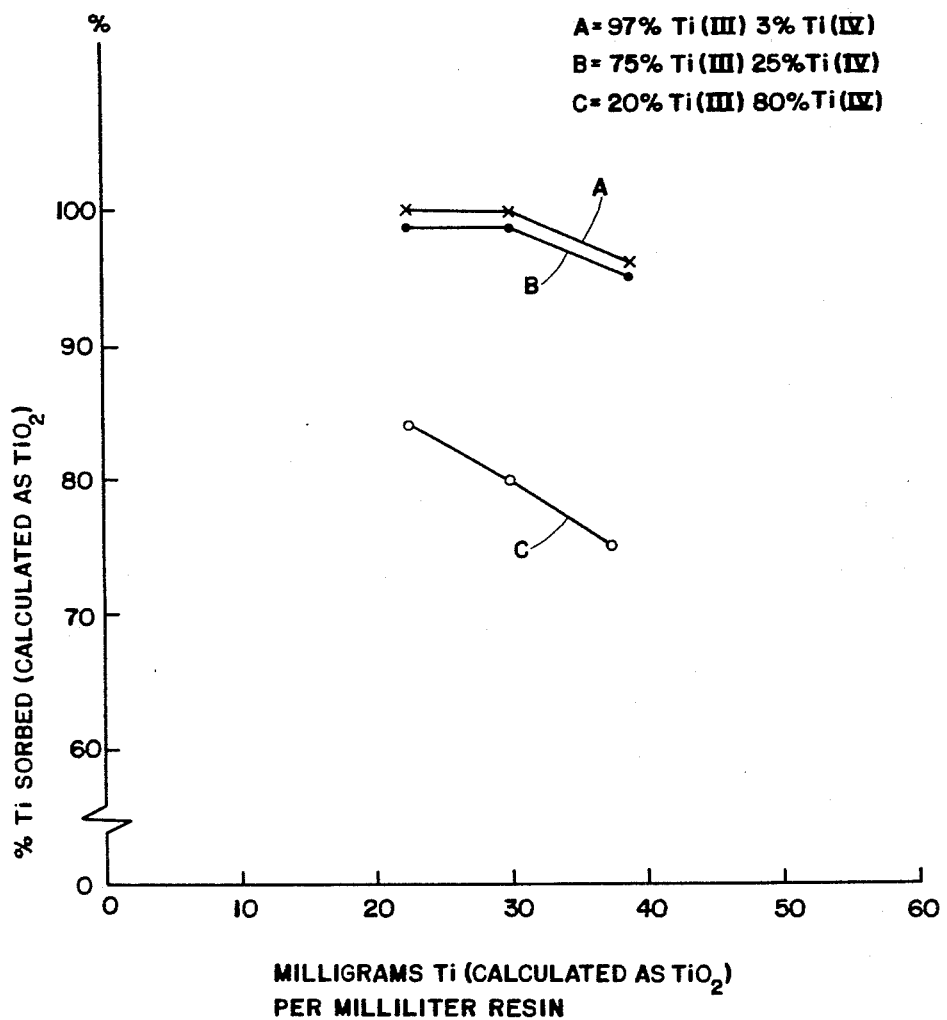

3,441,373
TITANIUM SALT PURIFICATION
James P. Bonsack, Aberdeen, Md., assignor, by mesne
assignments, to SCM Corporation, New York, N.Y.,
a corporation of New York
Filed Sept. 19, 1966, Ser. No. 580,458
Int. Cl. C01b 9/02; C07f 7/28
U.S. Cl. 23—87                                    10 Claims

ABSTRACT OF THE DISCLOSURE

A novel improved process for purifying an aqueous titanium salt solution containing trace impurities by contacting the solution with a cation exchange resin in the acid form, thereby sorbing titanium ion values on said resin and subsequently eluting the titanium ion values from the resin with an aqueous acid solution to form an effluent comprising a purified titanium salt solution is described. The invention is advantageous in that titanium salt solutions which are more highly purified than was heretofore possible can be obtained and provides titanium oxide products more suitable for use in ceramic capacitors.

---

The present invention is concerned with the production of titanium salts which are substantially free of trace impurities. The invention particularly relates to an improved process for removing trace impurities from titanium salts. The invention is advantageous in that titanium salts from which all, or substantially all, trace metallic impurities have been removed can be readily obtained. Removal of trace impurities from the salts is economically accomplished without initial loss and the subsequent expensive recovery of titanium which accompanies previously known titanium salt purification processes. Substantially pure titanium salts are valuable compounds of commerce and are used in products such as ceramic capacitors.

Trace metallic impurities such as aluminum, chromium, copper, iron, magnesium, manganese, molybdenum, nickel, niobium, selenium, sodium, vanadium, zirconium, etc., which are often present in $TiO_2$ from which most titanium salts are made, have heretofore been removed from titanium salts by a process in which an aqueous titanium salt solution, containing such trace metallic impurities and titanium ion values in preponderantly tetravalent form, is contacted with a cation exchange resin in the acid form. The cation exchange resin so contacted contains sorbed titanium ion values and sorbed trace metallic impurities and the titanium ion values are subsequently eluted with an aqueous acid solution to form an effluent (or eluent) comprising a purified titanium salt solution. Substantial quantities of the trace metal impurities remain uneluted in the resin.

It has been presently observed that conventional titanium salt solutions in which the titanium is substantially in tetravalent form and which contain one or more of the aforementioned trace impurities do not readily exchange titanium ion values for hydrogen ions when contacted with a cation exchange resin in the acid form. Consequently, a significant portion of the titanium remains in the aqueous salt solution after it is contacted with the cation exchange resin and the salt solution must be recycled through the resin at least several times in order to remove the titanium ion values from the solution.

It has also been observed that the titanium ion values of tetravalent titanium salts, when sorbed on cation exchange resins are not readily elutable therefrom and large quantities of aqueous acid solution are required to completely remove the sorbed titanium ion values from the resins to form purified titanium salt solutions.

The present invention provides an improvement in the aforedescribed process wherein substantially all of the titanium ion values are readily sorbed by and eluted from the cation exchange resin while the resin retains a major proportion of the cationic trace impurities initially present in the unpurified salt solution. The improvement comprises the steps of:

(a) Forming an acidic aqueous feed solution containing at least a major proportion of trivalent titanium ion values relative to tetravalent titanium ion values.

(b) Contacting said feed solution with the acid form of a cation exchange resin until at least a portion of the hydrogen ions of said cation exchange resin are replaced by sorbed titanium ion values from said feed solution.

(c) Eluting titanium ion values from said ion exchange resin with aqueous acid, thereby forming an effluent comprising a titanium containing salt solution purer than said feed solution with respect to said trace impurities.

By so proceeding, substantially all of the titanium initially present in the acidic aqueous feed solution can be readily recovered in the form of a purified titanium salt.

The accompanying figure illustrates the relative sorption of titanium ion values from acidic aqueous feed solutions wherein the titanium ion values (calculated as equivalent $TiO_2$) and acid concentrations of the solutions are substantially identical (e.g. 6.0 grams $TiO_2$ per liter and 24.5 grams of $H_2SO_4$ per liter) but wherein the feed solutions contain the varying ratios of trivalent and tetravalent titanium ion values indicated in the drawing. The acidic aqueous feed solutions were contacted with substantially identical resin volumes (137 ml.) in identical exchange columns (17 mm. diameter) of a cation exchange resin in the hydrogen form ("Dowex" 50-W—50 mesh). Identical contact times of the feed solution with the resin (e.g. 10 minutes) were employed in each instance. Each point on curves A, B, and C represents a coordinate of:

(1) The contact of an amount of aqueous feed solution (expressed as milligrams of $TiO_2$ per milliliter of resin) on the ordinate of the figure.

(2) Percent of titanium ion values sorbed by the resin (expressed as percentage of the total titanium—e.g. $TiO_2$) on the abscissa of the figure.

Curve A illustrates the sorption of indicated amounts of an aqueous feed solution in which 97% of the titanium ion values in the solution were trivalent and 3% were tetravalent. Curve B illustrates the sorption of titanium from indicated amounts of an acidic aqueous feed solution in which 75% of the titanium ion values in the solution were trivalent and 25% were tetravalent. Curve C illustrates the sorption of titanium from indicated amounts of an acidic aqueous feed solution in which 20% of the titanium ion values in the solution were trivalent and 80% were tetravalent.

The curves illustrate that the titanium ion values of acidic aqueous feed solutions containing major proportions of trivalent titanium ion values relative to tetravalent titanium ion values are substantially quantitatively sorbed by cation exchange resins in acid form until substantially all of the hydrogen ions of the resin have been exchanged for titanium ion values but that the titanium ion values of an acidic aqueous feed solution containing a major proportion of tetravalent titanium ion values relative to trivalent titanium ion values are not readily sorbed by the resins despite the presence of hydrogen ions available for exchange with titanium ion values in tetravalent form.

As will be evident hereinafter from the specific examples, the titanium ion values of titanium bearing cation exchange resins containing a major proportion of tetravalent titanium ion values are not readily elutable from the resin, requiring from 2 to 3 times more acid than the amount of acid required to elute titanium ion values from titanium-bearing cation exchange resins containing a major proportion of trivalent titanium ion values. The reason for the sorption difference illustrated in the figure (and also the difference in the elution properties) is not known with certainty, but the differences are believed to be due to the tendency of tetravalent titanium ion values to form polymerized compound species when in solution and upon contact with cation exchange resins, thus interfering with hydrogen ion exchange and consequently reducing elutability due to the lesser solubility of the polymerized species in aqueous acid.

The acidic aqueous feed solution, comprising an acidic aqueous salt solution containing at least a major proportion of trivalent titanium ions relative to tetravalent titanium ions also contains an acid: $TiO_2$ mole ratio of from about 2 to 1 to about 10 to 1. If the ratio is less than about 2 to 1, there is some danger that a portion of the $TiO_2$ moiety of the titanium salt will precipitate in the form of slurry. On the other hand, if the ratio is greater than 10 to 1, there is inefficient use of acid which is dilute and uneconomical to recover. The total acid values in solution are adjusted from about 0.10 to 0.60 equivalents per liter. The preferred total acid concentration is about 0.40–0.50 Normal (equivalents per liter).

The titanium salt concentration of the acidic aqueous feed solution may vary to some extent, depending upon a number of factors such as, for example, the amount of ion exchange resin employed, the exchange capacity of the resin and the amount of tetravalent titanium ion values in the feed solution. However, it has been found advantageous to employ feed solutions containing from about 0.1 to about 2 percent (calculated as $TiO_2$) in the form of a titanium salt. The acid component employed in the acidic aqueous feed solution can be any of a wide variety of mineral and organic acids or mixtures thereof provided that the acid will form a titanium salt which is water soluble when used within the concentration ranges hereinbefore described.

Examples of mineral acids which may be employed in the acidic aqueous feed solutions include hydrochloric, sulfuric and perchloric acids; examples of organic acids include halogenated acetic, oxalic, tartaric, citric, and the like. Regardless of the acid employed, the acid to $TiO_2$ mole ratio is within the ranges hereinbefore described.

The acidic aqueous feed solution can be readily formed by reducing an acidic aqueous titanium salt solution containing titanium (usually as a titanyl salt) which is in tetravalent form. Preferred unreduced titanium salt solutions are those containing from about two to about six weight percent (calculated as $TiO_2$) of a salt in the formula $$TiOX_n$$

where X is an acid anion and $n$ is an integer of 1 or 2. Such salts are preferred since the above-described acid: titanium (expressed as acid: $TiO_2$) ratios can be readily obtained without adversely affecting the exchange of titanium ion values for hydrogen ions during contact with the cation exchange resin.

In the above formula, X can be any of a number of monovalent and divalent, mineral or organic acid anions, including, for example, hydrochloric, sulfuric, halogenated acetic, or oxalic acid anions. Although X can be a trivalent acid, there is usually no advantage attained and the acid:$TiO_2$ ratio is often difficult to maintain.

The reduction of the acidic aqueous titanium salt solution can be accomplished in a variety of ways including chemical reduction with elemental metals, such as, for example, treatment of the salt solution with elemental zinc or aluminum, or by electrolytic means. Electrolytic reduction is preferred for economic reasons and specific, particularly preferred, electrolytic reduction methods will be hereinafter described in the specific examples.

As previously noted, the unreduced titanium salt solution contains preponderant amounts of tetravalent titanium ion values which are reduced by the aforementioned conventional reduction methods to the point where the reduced solution contains a major proportion, preferably from 60 to 100 percent, more preferably from 70 to 100 percent, of the ion values as trivalent titanium ion values. If the feed solution is partially or incompletely reduced to the point that it contains below about 60 percent trivalent titanium ion values and about 40 percent tetravalent titanium ion values, exchange of the titanium ion usually be inefficient and elution problems will often be encountered. When the reduced solution contains about 70 percent and more of trivalent titanium ion values and abuot 30 percent tetravalent titanium ion values, sorption of all (e.g. trivalent and tetravalent titanium ion values) of the titanium ion values on the cation exchange resin is, unexpectedly, substantially quantitative.

When the solution is partially reduced, that is, reduced to the point where the trivalent: tetravalent titanium ion values are from 40:60 or less to 50:50 it is believed that the trivalent titanium ion values are preferentially sorbed. However, when the feed solution is partially to completely reduced to the point where the trivalent:tetravalent titanium ion values are from 60:40 to 97:3, both kinds of titanium ion values are surprisingly almost quantitatively sorbed on the resin. In other words, the presence of a major proportion of trivalent titanium ion values promotes sorption of the tetravalent titanium ion values.

The cation exchange resins in the hydrogen form which can be employed in the process of this invention are those of an acid-base character such as nuclear sulfonic or methylene sulfonic acids. Such resins are commercially available in the hydrogen form; that is, hydrogen is the exchanging cation present in the resin. These and other applicable cation exchange resins are polymeric materials, containing phenolic, sulfonic, carboxylic, phosphonic, etc. acid groups as in integral portion of the resin. The resins also contain an equivalent amount of cations. The polymeric portion of the resin is usually cross-linked and the solubility of the resin in most liquids is negligible. Thus, the cation exchange resin are insoluble in water, acid resistant, are usually cross-linked, chemically stable and generally undergo a minimum of degradation during use.

Nuclear sulfonic cation exchange resins can be prepared by the sulfonation with sulfuric acid of a copolymer prepared from a mixture of styrene and divinylbenzene, for example, the resins described in U.S. Patent No. 2,-366,007. Reference is made to the Journal of Industrial and Engineering Chemistry, volume 39, page 2830, published in November 1947, which contains a description of the fundamental properties of a typical nuclear sulfonic acid cation exchange resin. Also, volumes entitled "Ion Exchange Resins" by Kunin and Myers, published in 1950 by John Wiley & Son, Inc., pages 54–57; and "Ion Exchange" by F. Helfferich, published in 1962 by McGraw-Hill, pages 26–71, describes the preparation of both sulfonic acid cation exchange resins and carboxylic-type cation exchange resins.

Commercially available cation exchange resins are sold under the following trademarks: "Dowex" 50; "Wofatit" P, K, KS; "Zeo Rex"; "Permutit" H and "Nalcite" HGR.

Other cation exchange resins including descriptions, properties, and the preparation thereof, are available in the literature and will be apparent to those skilled in the art. Of these resins, particulate nuclear sulfonic cation exchange resins having an average particle size of between about 20 and about 50 mesh have been found to be particularly advantageous in contacting the acidic aqueous feed solution in accordance with the process of this invention since such particulate resins have reasonably good exchange capacities and can be used in fixed bed form. Particulate resins having such mesh size are commercially available and lend themselves to control of flow rates of the acidic aqueous feed solution through the resin when a fixed resin bed is employed.

The contact of the acidic aqueous feed solution with the cation exchange resin can be accomplished in a variety of conventional ways, for example, contacting the solution with a fluidized resin bed; by slurrying the particulate resin with the acidic aqueous feed solution; by contacting the feed solutions in a column consisting of a fixed or partially fluidized bed of the resin either downwardly by gravity when the column is vertical or countercurrently (e.g. by pumping the solution upwardly), or the solution can be passed horizontally through a bed of the resin. It has been found preferable to contact the acidic aqueous feed solution with a fixed bed in a vertical column either downwardly or countercurrently and countercurrent contact has been found to be particularly advantageous since a more intimate contact between the solution with the resin is effected.

The ion exchange resin, after contact with the acidic aqueous feed solution, contains titanium ion values sorbed thereon as a result of the replacement of hydrogen ions of the cation exchange resin by titanium ion values from the feed solution. The titanium ion values can be recovered from the exchange resin by eluting the titanium ion values therefrom with an acid having a first dissociation constant of at least about $10^{-3}$ at 25° C. If the first dissociation constant of the acid is less than about $10^{-3}$ (e.g. $10^{-4}$) excessive amounts of acid will be required to elute the titanium ion values. The concentration of the aqueous acidic solution may vary widely from about 1 to about 4 Normal but is preferably from between about 2 to about 4 Normal. Although acid concentrations below 2 Normal may be employed in the elution step, elution times are unduly prolonged and the purified aqueous titanium salt solution will be excessively dilute, requiring concentration. Although higher acid concentrations may sometimes be employed, there is usually no advantage and there is also danger that some of the trace metallic impurities sorbed on the cation exchange resin will be eluted therefrom along with the titanium ion values, thus contaminating the purified titanium salt effluent.

A wide variety of acids may be employed in the elution step including, for example, HI, HBr, HCl, HClO₄, H₂SO₄, trihalo acetic acids, oxalic acids, citric, lactic, or tartaric acids. During and after the elution of the titanium ion values, the eluent contains preponderant quantities of a compound of the formula $$Ti_nA_3$$

wherein $n$ represents the number of titanium atoms to satisfy the valence of the acid. The titanium compound in the eluent is formed in accordance with the reaction $$n[(R_3)^{-3}Ti^{+3}]+3H_nA^{-n} \rightarrow 3n[R-H^+]+Ti_nA_3$$

where $(R_3)^{-3}Ti^{+3}$ represents the resin loaded with preponderant trivalent titanium ion values; $H_nA^{-n}$ represents the eluting acid, and $n$ represents the ionizable hydrogen ions per equivalent of resin or per molecule of acid; $R-H^+$ represents the hydrogen form of the regenerated resin and $Ti_nA_3$ represents the trivalent titanium salt form in the effluent or eluent.

The eluent formed will consist preponderantly of a trivalent titanium salt although some tetravalent titanium compounds may sometimes be present, the presence of the latter being dependent upon the titanium ion value quality of the feed solution.

As will be evident in the specific examples, the eluent solution is purer than the aqueous acidic feed solution with respect to trace metallic impurities and 90% and greater of certain impurities such as, for example, niobium, remain in the ion exchange resin.

The trivalent titanium salt solution can be readily converted to tetravalent titanium salts by conventional oxidation or oxidation in air. The conversion of trivalent titanium salts to tetravalent titanium salts generically proceeds in accordance with the formula $$\frac{4}{n}Ti_nA_3 + 2H_2O + O_2 \rightarrow \frac{4}{n}(TiO)_nA_2 + \frac{4}{n}H_nA$$

where $n$ and A are as above described.

Certain trace impurities remain sorbed on the cation exchange resin and are not eluted. After the titanium ion values have been eluted from the resin with acid, the resin is regenerated, that is, it is ready for reuse and can be contacted with fresh acidic aqueous feed solution. Because small quantities of impurities are initially present and sorbed, the cation exchange resin can be used repeatedly before requiring reconditioning by removing sorbed trace materials with more concentrated and/or more highly dissociated acid solutions.

The following specific examples are intended to illustrate the invention but not to limit the scope thereof, parts and percentages being by weight unless otherwise indicated.

EXAMPLE 1

Preparation of the acidic aqueous feed solution

An aqueous titanyl sulfate solution containing 25 grams per liter of TiO₂ and having an H₂SO₄/TiO₂ mole ratio of 3.5 was prepared by dissolving appropriate amounts of a pigmentary grade TiO₂, containing trace amounts (e.g., 1045 parts per million) of niobium and smaller amounts of iron and nickel in sulfuric acid and diluting the resultant solution with distilled water. The solution so prepared was fed into the cathode compartment of a standard electrolytic cell equipped with a 50 cm.² lead cathode and a 10 cm.² lead anode. The cathode compartment was separated from the anode compartment by a porous sintered glass plate. The anode compartment was filled with dilute (2 Normal) H₂SO₄ and the cathode compartment was blanketed with nitrogen to prevent re-oxidation of the titanium solution after electrolytic reduction. The electrolytic cell was equipped with an inlet tube opening into the cathode compartment for the introduction of the acidic titanyl sulfate solution and an outlet tube opening from the cathode compartment for removing the reduced acidic aqueous feed solution. The cathode current density employed was 10 milli-amperes per square centimeter and the cell voltage varied between 5.7–6.4. The rate of passage of the titanyl sulfate solution through the electrolytic cell was 1.2 milliliters per hour per square centimeter of cathode. The output of the cell was 1.5 grams of TiO₂ per hour.

The acidic aqueous solution recovered from the cell contained 75 percent titanium ion values in the form of trivalent titanium sulfate. The remainder of the titanium ion values were in the form of tetravalent titanyl sulfate, the above values being analytically determined. When a 25 cm.² cadmium cathode and a 10 cm.² platinum anode was used and the rate of passage of the above-described titanyl salt solution through the electrolytic cell was decreased to 1.0 milliliter per hour per square centimeter of cathode, the reduced solution contained 97 percent of the titanium ion values in the form of trivalent titanium sulfate and 3 percent of the titanium ion values in the form of tetravalent titanyl sulfate.

EXAMPLE 2

Contact of the acidic feed solution with cation exchange resin

The solution obtained in Example 1 was diluted with water until it had an H₂SO₄ concentration of 25 grams per liter and a correspondingly reduced titanium concentration. The solution was fed downwardly through a 2″ diameter vertical glass column containing 1800 cubic centimeters of "Dowex" 50–W in the hydrogen form. The resin was particulate and had an average particle size of 50 mesh. The contact time of single increment of the solution with the ion exchange resin in the column was 10 minutes. The effluent, from which substantially all of the titanium ion values had been removed and retained in the ion exchange column, consisted essentially of dilute sulfuric acid having a concentration of 0.5 Normal. The cation exchange resin had a calculated capacity for titanyl ions of 140 grams and a capacity for Ti (III) ions of 80.6 grams (calculated as $TiO_2$) and 13,100 milliliters of solution were fed through the column until the exchange capacity of the resin had been used up and essentially all of the hydrogen had been exchanged for titanium ions. The saturation of the column was determined by analysis of the effluent for titanium. Thirteeen and one-tenth (13.1) liters of acidic aqueous feed solution were passed through the column.

EXAMPLE 3

Elution of titanium ion values from the ion exchange resin

To the titanium-bearing ion exchange resin described in Example 2, there was added 5240 milliliters of 2.8 Normal HCl and the effluent, recovered after one passage of acid through the column, was collected. The HCl solution was passed through the column until the collected effluent contained no titanium ion values. The effluent which consisted essentially of $TiCl_3$ dissolved in hydrochloric acid was analyzed for niobium. The amount of niobium originally present in the acidic aqueous feed solution was 1045 parts per million based on the $TiO_2$. The effluent solution contained 40 parts per million, based on the $TiO_2$ content, demonstrating that more than 1,000 parts per million had been removed. A total of 77 grams (calculated as $TiO_2$) of titanium were obtained in the effluent.

EXAMPLE 4

Purification of titanium salt solution

An aqueous acidic feed solution containing 6.21 grams of $TiO_2$ per liter and 24.5 grams of $H_2SO_4$ per liter was prepared by diluting the acidic aqueous feed solution described in Example 1. This solution was introduced in 100 milliliter increments into a 17 millimeter diameter column containing 137 milliliters of the hydrogen form of the cation exchange resin described in Example 2. The capacity of the resin for Ti (III) ions (calculated) was equivalent to 6.16 grams of $TiO_2$. Each increment of feed solution was introduced into the column at a rate to provide a 10 minute contact time of the feed solution with the resin. Each increment of effluent of the feed solution was analyzed for titanium. The titanium solution introduced into the column contained substantially trivalent titanium sulfate (rather than tetravalent titanyl sulfate salts), 97 percent of the total titanium ion values being trivalent, e.g. [$Ti_2 (SO_4)_3$], and 3 percent being tetravalent titanyl sulfate. No titanium was found in the effluent of the first seven 100 milliliter increments fed into the column indicating complete sorption by the resin. The eighth increment contained 0.003 gram titanium calculated as $TiO_2$. The ninth increment contained 0.027 gram $TiO_2$, indicating that substantially all of the hydrogen ions in the resin had been exchanged for titanium ion values.

Since the theoretical capacity of the resin amounted to 6.16 grams of $TiO_2$ and the amount of titanium fed through the risen column was 5.589 grams $TiO_2$, the resin had sorbed 90 percent of its theoretical capacity for trivalent titanium ion values. The sorption operation efficiency was 99.5 percent of theoretical since 5.559 grams of $TiO_2$ were sorbed.

A titanium chloride solution was recovered by eluting the titanium-bearing ion exchange resin with 200 milliliters of a 2 Normal hydrochloric acid solution in accordance with the procedures described in Example 3.

Analysis of the titanium trichloride recovered in the effluent demonstrated that it contained 40 parts per million niobium on the basis of the $TiO_2$ values in the effluent. The $TiO_2$ values originally employed contained 1045 parts per million niobium prior to contact with the ion exchange resin.

By way of contrast, when the above procedure was repeated using an unreduced solution of titanyl sulfate containing 5.85 grams $TiO_2$ per liter and 24.3 grams of sulfuric acid per liter, titanium leakage occurred almost immediately, indicating lack of sorption of the resin for significant quatities of tetravalent titanium ion values.

The effluent of the first 100 milliliter increment fed through the resin column contained 0.14 gram of $TiO_2$, the effluent of the second 100 milliliter increment contained 0.155 gram of $TiO_2$, and the effluent of the third increment contained 0.166 gram of $TiO_2$. Since 1.755 grams of $TiO_2$ were fed through the resin column in the three 100 milliliter increments and 0.461 gram of $TiO_2$ was not sorbed by the resin, the sorption was only 73 percent (of theoretical) efficient after only three 100 milliliter increments.

Since the theoretical capacity of the resin column for tetravalent titanium amounted to 10.7 grams of $TiO_2$ and only 1.294 grams of $TiO_2$ had been sorbed, only 12 percent of the theoretical capacity of the resin had been utilized.

Additional increments were fed through the resin column until the resin capacity was reached. The unreduced effluent solution was recycled five times through fresh resin before the titanyl ions sorbed.

Also, in eluting the trivalent titanium values from the cation exchange resin, only 400 milliliters of 2 Normal hydrochloric acid were required to recover the titanium trichloride, whereas 900 milliliters of acid were required to elute the sorbed tetravalent titanium ion values.

The procedure of the first four paragraphs of Example 4 was repeated except that the aqueous acid fed solution was introduced counter-currently (up-flow) through the cation ion exchange resin bed and the sorbed resin containing titanium ion values was eluted, also counter-currently, with oxalic acid. Approximately the same amount of titanium in the form of titanium oxalate [$Ti_2 (C_2O_4)_3$] was recovered in the eluate.

The trivalent titanium salts recovered in the process of this invention may be readily oxidized, in air or by conventional chemical means, to form titanyl salts which may then be used in commercial applications, such as in the fabrication of ceramic capacitors.

What is claimed is:

1. In a process for purifying an aqueous titanium salt solution containing trace metallic imprities by contacting the solution with a cation exchange resin in the acid form and subsequently eluting the cation exchange resin with an aqueous acidic solution to form an effluent comprising a purified titanium salt solution, the improvement which comprises the steps of:
    (a) forming an acidic aqueous feed solution and where the trivalent:tetravalent titanium values therein are within the ratio of 60:40 to 97:3;
    (b) contacting said fed solution with the acid form of a cation exchange resin until at least a portion of the hydrogen ions of the said ion exchange resins are replaced by sorbed trivalent and tetravalent titanium ion values along with the trace impurities from said acidic aqueous feed solution; and
    (c) eluting the titanium ion values from said ion exchange resin with an aqueous acid without eluting the trace metallic impurities, thereby forming a titanium salt containing an effluent solution purer than said feed solution with respect to trace impurities.

2. The process of claim 1 wherein the acidic aqueous feed solution has an acid to $TiO_2$ mole ratio of from about 2:1 to about 10:1 and a $TiO_2$ concentration of from about 0.1 to about 2 percent.

3. The process of claim 1 wherein the acidic aqueous feed solution is formed by reducing an acidic aqueous titanium salt solution comprising from about 1 to about 10 weight percent of a compound of the formula $$TiOX_n$$

where X is an acid anion and $n$ is an integer of from 1 to 2.

4. The process of claim 3 wherein, in the formula, X is a sulfuric acid anion and $n$ is 1.

5. The process of claim 1 wherein the titanium feed solution contains at least about 70 percent trivalent values.

6. The process of claim 1 wherein the acidic aqueous feed solution formed containers from about .1 to about 2 weight percent of titanium ion values calculated as $TiO_2$.

7. The process of claim 1 wherein the feed solution is contacted counter-currently with a fluidized bed of cation exchange resin in an amount and for a time sufficient to exchange substantially all of the titanium ion values in said feed solution for hydrogen ions.

8. The process of claim 1 wherein the cation exchange resin is of the nuclear sulfonic type.

9. The process of claim 1 wherein the sorbed titanium ion values are eluted from the cation exchange resin by contacting said resin with an aqueous acidic solution having an acid concentration of from about 1 to about 4 Normal; said acid having a first dissociation constant of at least about $10^{-3}$ in an amount and for a time sufficient to remove said titanium ion values from said resin.

10. The process of claim 9 wherein the aqueous acid solution employed in eluting the sorbed titanium ions is selected from the group consisting of aqueous solutions of hydrochloric and oxalic acids.

References Cited

UNITED STATES PATENTS

| | | | |
|---|---|---|---|
| 3,001,854 | 9/1961 | Kenworthy | 23—117 |
| 3,025,135 | 3/1962 | Kenworthy | 23—87 |
| 3,063,807 | 11/1962 | Kenworthy | 23—202 |

EDWARD STERN, *Primary Examiner.*

U.S. Cl. X.R.

23—50, 85, 117; 204—93; 260—429.5, 538